United States Patent [19]
Wolber et al.

[11] 3,733,808
[45] May 22, 1973

[54] DEVICE FOR THE PRECISION ADJUSTMENT OF A BALANCE

[75] Inventors: Robert Wolber, Lauterbach; Josef King, Schramberg-Sulgen; Eckhart Kern, Schramberg, all of Germany

[73] Assignee: Firma Gebruder Junghans G.m.b.H., Schramberg, Germany

[22] Filed: Nov. 5, 1971

[21] Appl. No.: 195,968

[30] Foreign Application Priority Data

Nov. 9, 1970  Germany.................P 20 55 063.4

[52] U.S. Cl................................................58/112
[51] Int. Cl...............................................G04b 17/14
[58] Field of Search.................................58/109, 112

[56] References Cited
UNITED STATES PATENTS

| 3,579,977 | 5/1971 | Meylan-Rochat | 58/112 |
| 1,144,026 | 6/1915 | Busenbenz | 58/112 |
| 3,397,530 | 8/1968 | Besson et al | 58/112 |
| 3,451,212 | 6/1969 | Marti | 58/109 |

FOREIGN PATENTS OR APPLICATIONS

| 482,234 | 6/1969 | Switzerland | 58/112 |
| 461,378 | 10/1968 | Switzerland | 58/112 |

*Primary Examiner*—George H. Miller, Jr.
*Attorney*—James E. Cockfield et al.

[57] ABSTRACT

Balance wheel adjusting apparatus for a timepiece characterized by an adjusting lever which elastically engages an inclined surface on a regulating spindle. The inclined surface on the regulating spindle is inclined at an acute angle in relation to a swivel axis of the adjusting lever and this swivel axis generally coincides with the axis of the balance wheel.

8 Claims, 4 Drawing Figures

DEVICE FOR THE PRECISION ADJUSTMENT OF A BALANCE

The invention relates to a device for the precision regulation of a balance with an elastic regulating lever. This lever is swivelable and, in response to its swiveling, operates a balance regulator. The regulator rests elastically on an axially fixed regulating spindle.

In the case of such a device, whenever the transfer of movement to the regulator is to take place without "play", special precautions must be taken in order to eliminate such play at the bearings of the regulating spindle, at the bearing zone of the regulating lever, and on the place of engagement between regulating lever and regulating spindle.

Arrangements for the precision adjustment of a balance have been known where the regulating spindle rests elastically on a toothed segment of a regulating lever (U.S. Pat. No. 1,144,026, Swiss patents Nos. 459,892 and 482,234, German patent No. 1,281,956 and German Utility patents Nos. 1,891,385 and 1,779,785). In the case of other embodiments, the toothed segment of the regulating lever itself is made elastically (Swiss patent No. 461,378). In the case of still other embodiments, the toothed segment of the regulating lever is always pulled against one side of the flanks of the screw thread of the regulating spindle (German Utility patent No. 1,884,282). Finally, constructions have also been known in which the regulating lever itself is made elastically and rests elastically on the regulating spindle (German Utility patents Nos. 1,910,487 and 6,807,193).

In the previously mentioned known embodiments it is true that certain of the above-mentioned requirements concerning freedom from play are fulfilled, however, these known measures require a relatively large expenditure. In the case of the last mentioned construction it is true a considerable simplification has already been achieved even with a view to the mounting of the regulating spindle. However, in this known construction, the play of the bearing of the regulating spindle is either not eliminated or only imperfectly eliminated. The resulting play in this device can considerably distort a regulating measure.

SUMMARY OF THE INVENTION

The invention is based on the objective of creating a device for the precision regulation of a balance of the initially mentioned type, which can be produced in a very simple manner and in which nevertheless a freedom from play of the adjusting transmission is assured.

According to the invention, this will be achieved through the fact that the free end of the regulating lever rests on the surface area of the regulating spindle which is inclined at an acute angle toward the swiveling axis of the regulating lever. If, therefore, and for example, a regulating spindle with a screw thread is used, then the end of the regulating lever will not extend up to the axis of the regulating spindle, but it extends further than to the base of the spindle. As a result, force components act on the regulating lever which brace it in its bearing or rotary mount both in a radial as well as in an axial direction such that freedom from play is assured. If, on the other hand, one uses a regulating spindle with a part enlarged for example in the shape of a cone, then the regulating lever can rest with its end on the surface area of this cone shaped area. As a result of this, the above-mentioned bracings will likewise be achieved in a radial and in an axial direction with regard to the bearing of the regulating lever. Special measures for bracing will become superfluous as a result.

A special toothing between the spindle and the regulating lever is basically not required. But it is effective in order to avoid any play or any unintentional shifting while overcoming the friction.

The surface area of the spindle on which the end of the regulating lever rests is preferably inclined at an angle of 45° toward the swiveling axis of the regulating lever.

The regulating spindle can be mounted between two working plates, whereby the spindle element located between the plates is provided with two contact surfaces fitting with friction against the surfaces of the plates facing each other. For practical purposes, the regulating spindle between the plates can have a collar which touches the plates with its terminal surfaces. In order to assure a mounting of the spindle free from play in an axial direction, at least one bearing for the regulating spindle can be provided on a lobe of the plates which is prestressed in the direction toward the other plate.

The regulating spindle can be mounted with a peg in only one plate and can have a part which widens in the form of a cone, on the slanting surface of which the end of the regulating lever rests. Here a mounting free of play of the spindle will be achieved by the supporting force, both in an axial as well as in a radial direction.

Effectively, the regulating lever and the regulating spindle will be in engagement with one another via toothed systems. In order to achieve a very simple type of production, only one element (i.e. the regulating spindle or the end of the regulating lever) can be provided with tooth means or toothing. The adjacent other element may consist of a material which is less hard as compared to the material of the first element and which is shaped [molded]plastically by means of the toothing of the first element. In this manner, the toothing of the second element is plastically and conformingly formed by the first element so as to assure with great certainty a freedom from play.

As can easily be seen, a very simple device for the precision regulation will be created by the invention, and in which the disadvantages occurring in known devices are eliminated.

DRAWINGS

The invention is explained in more detail in the following paragraphs on the basis of the drawing and by way of some embodiments given by way of example. In the drawing.

DESCRIPTION OF PREFERRED EMBODIMENTS

Figure 1:
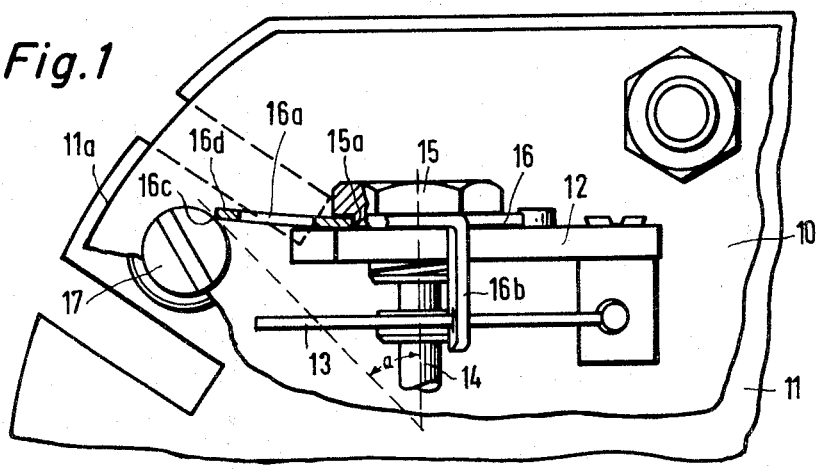
FIG. 1 shows a side view of a first embodiment according to the invention, partially in section and given by way of example.
Figure 2:
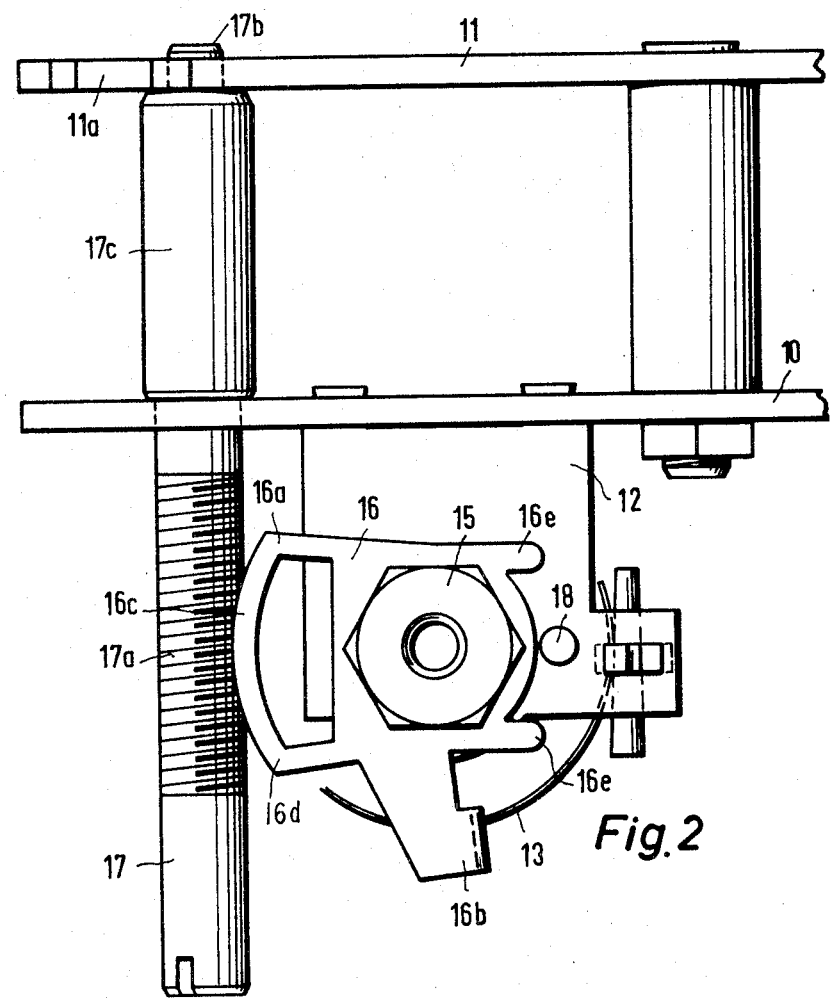
FIG. 2 shows an elevational view of the embodiment in FIG. 1 given by way of example.

In FIGS. 1 and 2 the two plates of a clock mechanism are designated by 10 and 11. A flange 12 is attached to plate 10, for example, by way of rivets. This flange accommodates or supports a bearing screw 15. Screw 15 serves to mount one end of shaft 14 of the balance.

The bearing screw 15 has a rim or collar 15a on which a regulating lever 16 is pivotably mounted. This regulating lever has two arms 16a which carry an elastic segment shaped arm 16d, which can be provided with a segmented, toothing surface 16c.

Item 17 is the regulating spindle which is mounted between, and journaled in, plates 10 and 11. Spindle 17 has a peg 17b and a collar 17c, the terminal surfaces of which collar fit against plates 10 and 11. In order to assure a freedom from "play" in an axial direction, the bearing for peg 17b can be provided in a flange 11a, which, in its free state is flexed toward plate 11. Thus, flange 11a is prestressed in the direction toward plate 10, so that collar 17c between plates 10 and 11 is axially clamped down to a certain extent. Spindle 17 also has a thread 17a which threadably engages with thread 16c of the segment shaped arm 16d.

The spiral spring of the balance, which balance is conventional and has not been shown, has been given number 13. The effective length of this spring is changeable by means of movement of the lever 16a as effected by the horizontal swing of the regulating lever 16b, i.e. rotation of lever 16b about post 15. This rotation alters the position of engagement of lever 16b and spring 13 so as to alter the effective spring length.

As can be seen from the drawing, the lever 16 does not extend with its free, segment shaped end 16d disposed to overlap the axis of the threaded spindle 17, but it extends so as to be flexed and overlap the peripheral surface of spindle 17. That is to say, it rests on the peripheral surface area of the spindle with an inclination relationship to the swiveling axis of the regulating lever 16. This axis is also at the same time the axle of the balance. The peripheral surface 17e engaged by the lever end is inclined at an acute angle a to this axis. Preferably, this angle amounts to about 45°. Force components are produced through this resting of the end of the lever on the spindle, which force components prestress the regulating lever both in a radial as well as in an axial direction. As a result of this, one will achieve a freedom from play of the bearing which is associated with element 15.

Through selection, according to the invention as aforenoted, of the place of support for the regulating lever on the regulating spindle, components of the bearing pressure of end 16d develop on the regulating spindle 17 in the generally radial direction between the regulating bearing and regulating spindle bearings. As a result, the radial play of the bearing of the regulating lever and of the regulating spindle is eliminated always in the same direction.

In order to limit the swiveling range of regulating lever 16, the latter can be equipped with extensions 16e. A peg 18 attached to flange 12 is engageable with these extensions, as shown in FIG. 2. Peg 18 also can be stamped out from flange 12.

Figure 3:
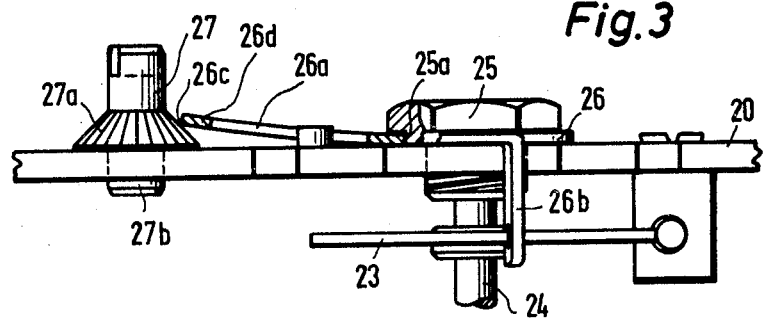
FIG. 3 shows a side view of a second embodiment according to the invention, partially in section, given by way of example.
Figure 4:
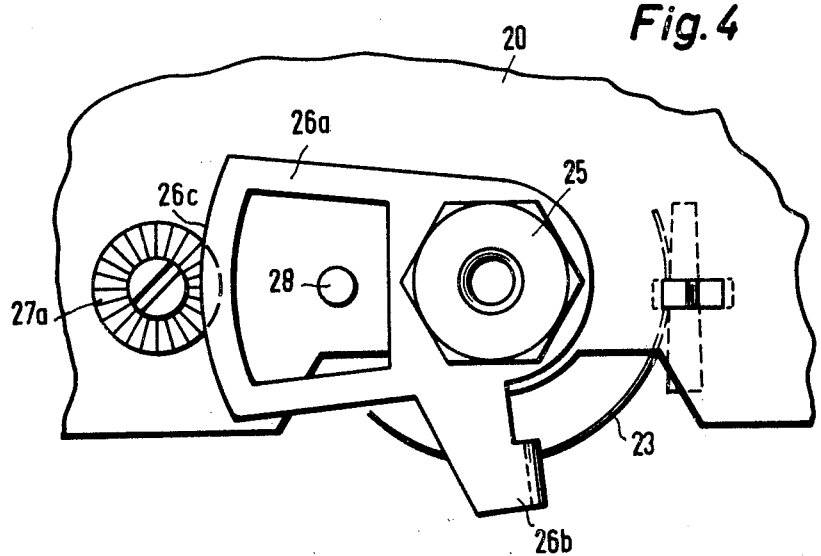
FIG. 4 shows an elevational view of the embodiment according to FIG. 3, given by way of example.

In the embodiment according to FIGS. 3 and 4, the reference number 20 designates a plate, into which the bearing screw 25 for a balance, (which balance is not shown), has been screwed in. Item 24 designates one end of a shaft for the balance, on which a clock spring 23 has been attached. In this case, like the first embodiment, the bearing screw 25 has a collar 25a on which a regulating lever 26 with an arm 26b is journaled. The regulating lever 26 can have two arms 26a, which are connected by means of a segment shaped arm 26d.

Reference number 27 designates a regulating spindle which is mounted in plate 20 by way of an extension or shaft 27b. Spindle 27 has a frustoconical part 27a which widens in the shape of a cone and which is inclined in relation to the axis of the spindle and which together with said spindle constitutes an angle of 45°. The spindle is forced axially against plate 20 by means of segment shaped element 26d resting elastically on the surface area of the conical part 27a and is braced in the bearing at the same time also in a radial direction. At the same time the regulating lever 26 is also braced in its bearing or journal mount through the bearing pressures, as a result of which freedom from play is assured.

Effectively, the surface area 27a of spindle 27 is provided with a conical toothing, and the edge 26c of the segment shaped arm 26d is likewise provided with a toothing, which meshingly engages with the toothing of spindle 27. But it is also possible to provide only one of the parts 27a and 26c with a toothing, when the adjacent part is produced from a material of lesser hardness. In this case, the toothing is cut in the adjacent part by way of the toothing of the one part. In that way a freedom from play between the toothings will be assured. In order to assure the cut, the less hard part can consist for example of brass, aluminum or plastic, while the other part consists for example of steel. Preferably, spindle 27 consists of steel and has a conical toothing 27a, while the regulating lever 26 is made of plastic and rests with its edge 26c on the toothing 27a. As a result of the support pressure, the teeth of the spindle 27 cut into the plastic.

Preferably, a triangular cross section thread or a triangular toothing will be used for the regulating spindle 17 according to FIGS. 1 and 2 or 27 according to FIGS. 3 and 4.

The embodiment according to the invention, as can be seen without difficulty, can be produced in a particularly simple manner, whereby one of the parts (regulating spindle or regulating lever) also can be made without toothing, whereby the spring action of the regulating lever is used at the same time for the bracing or securing of the parts of the gearing, as a result of which freedom from play without any additional measures is assured.

In the case of the embodiment according to FIGS. 3 and 4, a peg 28 can be provided in plate 20, which cooperates with arms 26a and which brings about a limitation of the swiveling movement of the regulating lever 26.

OVERALL SCOPE OF THE INVENTION

In describing the two preferred embodiments of the invention certain variations in the manner in which the invention may be practiced have been illustrated.

Those skilled in the timepiece art and familiar with this disclosure may well recognize other deletions, substitutions, additions, modifications, or changes which would fall within the scope of the invention as defined in the appended claims.

What is claimed is:

1. Apparatus for the precision adjustment of a balance comprising:
   balance regulating means;

an elastic, pivotal, regulating lever operable to operate said regulating means;
an axially fixed, regulating spindle on which said regulating lever elastically rests;
a free end of said regulating lever resting on a peripheral surface area of the spindle, said surface area being inclined at an acute angle in relation to the swiveling axis of the regulating lever.

2. Apparatus according to claim 1, wherein:
the peripheral surface area of the spindle, on which the end of the regulating lever rests, is inclined at an angle of about 45° to the swiveling axis of the regulating lever.

3. Apparatus according to claim 2 wherein:
the regulating spindle is mounted between two working plates (10, 11); and
the regulating spindle has a collar disposed between said plates, which collar frictionally touches with its terminal surfaces the plates.

4. Apparatus according to claim 1 wherein:
the regulating spindle is mounted between two working plates (10, 11); and
the regulating spindle has a collar disposed between said plates, which collar frictionally touches with its terminal surfaces the plates.

5. Apparatus according to claim 3 wherein:
at least one bearing for the regulating spindle is provided on a flange carried by one of said plates;
said flange being prestressed in the direction of the other of said plates.

6. Apparatus according to claim 1 wherein:
said apparatus includes
a plate means;
peg means;
said regulating spindle is journaled only on said plate means through said peg means; and
said spindle means has a conically widened part, on an oblique surface of which rests the end of the regulating lever.

7. Apparatus according to claim 1 wherein:
said regulating lever and the regulating spindle engage with one another via meshed teeth means.

8. Apparatus according to claim 7 wherein:
one of said regulating spindle and end of said regulating lever is equipped with relatively hard tooth means; and
the other of said spindle and lever end consists of a material, which is molded plastically by said tooth means into a meshing configuration.

* * * * *